US006990506B2

(12) United States Patent
Sun

(10) Patent No.: US 6,990,506 B2
(45) Date of Patent: Jan. 24, 2006

(54) INTEGER COSINE TRANSFORM MATRIX FOR PICTURE CODING

(75) Inventor: Shijun Sun, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 640 days.

(21) Appl. No.: 10/017,722

(22) Filed: Dec. 13, 2001

(65) Prior Publication Data

US 2002/0111979 A1    Aug. 15, 2002

Related U.S. Application Data

(60) Provisional application No. 60/255,352, filed on Dec. 13, 2000.

(51) Int. Cl.
    *G06F 17/14*    (2006.01)
(52) U.S. Cl. ...................................... 708/402; 382/250
(58) Field of Classification Search ................ 708/402; 382/250
    See application file for complete search history.

(56) References Cited

U.S. PATENT DOCUMENTS 5,703,799 A    12/1997  Ohta .......................... 364/725

| 5,999,656 A | 12/1999 | Zandi et al. ................. 382/248 |
| 5,999,957 A | 12/1999 | Ohta ........................... 708/400 |
| 2004/0046754 A1 * | 3/2004 | Mayer et al. ................ 345/204 |
| 2004/0126021 A1 * | 7/2004 | Sull et al. .................... 382/233 |

OTHER PUBLICATIONS

Ying-Jui Chen, Soontorn Oraintara, and Truong Nguyen, "Video Compression Using Integer DCT", Proceedings of IEEE International Conference on Image Processing (ICIP), 2000, pp. 1-4.
Mathias Wien, Claudia Mayer, and Jens-Rainer Ohm, "Integer Transforms for H.26L Using Adaptive Block Transforms", ITU-T Q15/SG16, Document Q15/K24, Portland, Oregon, Aug. 2000, pp. 1-5.
Mathias Wien and Shijun Sun, "ICT Comparison for Adaptive Block Transforms", ITU-T VCEG-L12, Germany, Jan. 2001, pp. 1-6.
P.P. Vaidyanathan, "Multirate Systems and Filter Banks", Prentice Hall, 1993, pp. 830-833.

* cited by examiner

*Primary Examiner*—D. H. Malzahn
(74) *Attorney, Agent, or Firm*—Marger Johnson & McCollom, P.C.

(57)    ABSTRACT

An integer transform matrix is used for implementing a Discrete Cosine Transform (DCT). Optimized values for the integer transform matrix are derived that satisfy certain normalization constraints and that also minimize the frequency distortion in the transform matrix.

12 Claims, 3 Drawing Sheets

$$T_{16}=\begin{bmatrix}t_0\\t_1\\t_2\\t_3\\t_4\\t_5\\t_6\\t_7\\t_8\\t_9\\t_{10}\\t_{11}\\t_{12}\\t_{13}\\t_{14}\\t_{15}\end{bmatrix}=\begin{bmatrix}n_0&n_0&n_0&n_0&n_0&n_0&n_0&n_0&n_0&n_0&n_0&n_0&n_0&n_0&n_0&n_0\\n_1&n_3&n_5&n_7&n_9&n_{11}&n_{13}&n_{15}&-n_{15}&-n_{13}&-n_{11}&-n_9&-n_7&-n_5&-n_3&-n_1\\n_2&n_6&n_{10}&n_{14}&-n_{14}&-n_{10}&-n_6&-n_2&-n_2&-n_6&-n_{10}&-n_{14}&n_{14}&n_{10}&n_6&n_2\\n_3&n_9&n_{15}&-n_{11}&-n_5&-n_1&-n_7&-n_{13}&n_{13}&n_7&n_1&n_5&n_{11}&-n_{15}&-n_9&-n_3\\n_4&n_{12}&-n_{12}&-n_4&-n_4&-n_{12}&n_{12}&n_4&n_4&n_{12}&-n_{12}&-n_4&-n_4&-n_{12}&n_{12}&n_4\\n_5&n_{15}&-n_7&-n_3&-n_{13}&n_9&n_1&n_{11}&-n_{11}&-n_1&-n_9&n_{13}&n_3&n_7&-n_{15}&-n_5\\n_6&-n_{14}&-n_2&-n_{10}&n_{10}&n_2&n_{14}&-n_6&-n_6&n_{14}&n_2&n_{10}&-n_{10}&-n_2&-n_{14}&n_6\\n_7&-n_{11}&-n_3&n_{15}&n_1&n_{13}&-n_5&-n_9&n_9&n_5&-n_{13}&-n_1&-n_{15}&n_3&n_{11}&-n_7\\n_8&-n_8&-n_8&n_8&n_8&-n_8&-n_8&n_8&n_8&-n_8&-n_8&n_8&n_8&-n_8&-n_8&n_8\\n_9&-n_5&-n_{13}&n_1&-n_{15}&-n_3&n_{11}&n_7&-n_7&-n_{11}&n_3&n_{15}&-n_1&n_{13}&n_5&-n_9\\n_{10}&-n_2&n_{14}&n_6&-n_6&-n_{14}&n_2&-n_{10}&-n_{10}&n_2&-n_{14}&-n_6&n_6&n_{14}&-n_2&n_{10}\\n_{11}&-n_1&n_9&n_{13}&-n_3&n_7&n_{15}&-n_5&n_5&-n_{15}&-n_7&n_3&-n_{13}&-n_9&n_1&-n_{11}\\n_{12}&-n_4&n_4&-n_{12}&-n_{12}&n_4&-n_4&n_{12}&n_{12}&-n_4&n_4&-n_{12}&-n_{12}&n_4&-n_4&n_{12}\\n_{13}&-n_7&n_1&-n_5&n_{11}&n_{15}&-n_9&n_3&-n_3&n_9&-n_{15}&-n_{11}&n_5&-n_1&n_7&-n_{13}\\n_{14}&-n_{10}&n_6&-n_2&n_2&-n_6&n_{10}&-n_{14}&-n_{14}&n_{10}&-n_6&n_2&-n_2&n_6&-n_{10}&n_{14}\\n_{15}&-n_{13}&n_{11}&-n_9&n_7&-n_5&n_3&-n_1&n_1&-n_3&n_5&-n_7&n_9&-n_{11}&n_{13}&-n_{15}\end{bmatrix}$$

$$T_4 = \begin{bmatrix} t_0 \\ t_1 \\ t_2 \\ t_3 \end{bmatrix} = \begin{bmatrix} n_0 & n_0 & n_0 & n_0 \\ n_1 & n_3 & -n_3 & -n_1 \\ n_2 & -n_2 & -n_2 & n_2 \\ n_3 & -n_1 & n_1 & -n_3 \end{bmatrix}$$

FIG. 1

$$T_8 = \begin{bmatrix} t_0 \\ t_1 \\ t_2 \\ t_3 \\ t_4 \\ t_5 \\ t_6 \\ t_7 \end{bmatrix} = \begin{bmatrix} n_0 & n_0 & n_0 & n_0 & n_0 & n_0 & n_0 & n_0 \\ n_1 & n_3 & n_5 & n_7 & -n_7 & -n_5 & -n_3 & -n_1 \\ n_2 & n_6 & -n_6 & -n_2 & -n_2 & -n_6 & n_6 & n_2 \\ n_3 & -n_7 & -n_1 & -n_5 & n_5 & n_1 & n_7 & -n_3 \\ n_4 & -n_4 & -n_4 & n_4 & n_4 & -n_4 & -n_4 & n_4 \\ n_5 & -n_1 & n_7 & n_3 & -n_3 & -n_7 & n_1 & -n_5 \\ n_6 & -n_2 & n_2 & -n_6 & -n_6 & n_2 & -n_2 & n_6 \\ n_7 & -n_5 & n_3 & -n_1 & n_1 & -n_3 & n_5 & -n_7 \end{bmatrix}$$

FIG. 2

$$T_{16} = \begin{bmatrix} t_0 \\ t_1 \\ t_2 \\ t_3 \\ t_4 \\ t_5 \\ t_6 \\ t_7 \\ t_8 \\ t_9 \\ t_{10} \\ t_{11} \\ t_{12} \\ t_{13} \\ t_{14} \\ t_{15} \end{bmatrix} = \begin{bmatrix} n_0 & n_0 & n_0 & n_0 & n_0 & n_0 & n_0 & n_0 & n_0 & n_0 & n_0 & n_0 & n_0 & n_0 & n_0 & n_0 \\ n_1 & n_3 & n_5 & n_7 & n_9 & n_{11} & n_{13} & n_{15} & -n_{15} & -n_{13} & -n_{11} & -n_9 & -n_7 & -n_5 & -n_3 & -n_1 \\ n_2 & n_6 & n_{10} & n_{14} & -n_{14} & -n_{10} & -n_6 & -n_2 & -n_2 & -n_6 & -n_{10} & -n_{14} & n_{14} & n_{10} & n_6 & n_2 \\ n_3 & n_9 & n_{15} & -n_{11} & -n_5 & -n_1 & -n_7 & -n_{13} & n_{13} & n_7 & n_1 & n_5 & n_{11} & -n_{15} & -n_9 & -n_3 \\ n_4 & n_{12} & -n_{12} & -n_4 & -n_4 & -n_{12} & n_{12} & n_4 & n_4 & n_{12} & -n_{12} & -n_4 & -n_4 & -n_{12} & n_{12} & n_4 \\ n_5 & n_{15} & -n_7 & -n_3 & -n_{13} & n_9 & n_1 & n_{11} & -n_{11} & -n_1 & -n_9 & n_{13} & n_3 & n_7 & -n_{15} & -n_5 \\ n_6 & -n_{14} & -n_2 & -n_{10} & n_{10} & n_2 & n_{14} & -n_6 & -n_6 & n_{14} & n_2 & n_{10} & -n_{10} & -n_2 & -n_{14} & n_6 \\ n_7 & -n_{11} & -n_3 & n_{15} & n_1 & n_{13} & -n_5 & -n_9 & n_9 & n_5 & -n_{13} & -n_1 & -n_{15} & n_3 & n_{11} & -n_7 \\ n_8 & -n_8 & -n_8 & n_8 & n_8 & -n_8 & -n_8 & n_8 & n_8 & -n_8 & -n_8 & n_8 & n_8 & -n_8 & -n_8 & n_8 \\ n_9 & -n_5 & -n_{13} & n_1 & -n_{15} & -n_3 & n_{11} & n_7 & -n_7 & -n_{11} & n_3 & n_{15} & -n_1 & n_{13} & n_5 & -n_9 \\ n_{10} & -n_2 & n_{14} & n_6 & -n_6 & -n_{14} & n_2 & -n_{10} & -n_{10} & n_2 & -n_{14} & -n_6 & n_6 & n_{14} & -n_2 & n_{10} \\ n_{11} & -n_1 & n_9 & n_{13} & -n_3 & n_7 & n_{15} & -n_5 & n_5 & -n_{15} & -n_7 & n_3 & -n_{13} & -n_9 & n_1 & -n_{11} \\ n_{12} & -n_4 & n_4 & -n_{12} & -n_{12} & n_4 & -n_4 & n_{12} & n_{12} & -n_4 & n_4 & -n_{12} & -n_{12} & n_4 & -n_4 & n_{12} \\ n_{13} & -n_7 & n_1 & -n_5 & n_{11} & n_{15} & -n_9 & n_3 & -n_3 & n_9 & -n_{15} & -n_{11} & n_5 & -n_1 & n_7 & -n_{13} \\ n_{14} & -n_{10} & n_6 & -n_2 & n_2 & -n_6 & n_{10} & -n_{14} & -n_{14} & n_{10} & -n_6 & n_2 & -n_2 & n_6 & -n_{10} & n_{14} \\ n_{15} & -n_{13} & n_{11} & -n_9 & n_7 & -n_5 & n_3 & -n_1 & n_1 & -n_3 & n_5 & -n_7 & n_9 & -n_{11} & n_{13} & -n_{15} \end{bmatrix}$$

FIG. 3

INTEGER COSINE TRANSFORM MATRIX FOR PICTURE CODING

This application claims priority from U.S. Provisional Application Ser. No. 60/255,352, filed Dec. 13, 2000.

BACKGROUND

Integer-based transform matrices are used for transform coding of digital signals, such as for coding image/video signals. Discrete Cosine Transforms (DCTs) are widely used in block-based transform coding of image/video signals, and have been adopted in many Joint Photographic Experts Group (JPEG), Motion Picture Experts Group (MPEG), and network protocol standards, such as MPEG-1, MPEG-2, H.261, and H.263. Ideally, a DCT is a normalized orthogonal transform that uses real-value numbers. This ideal DCT is referred to as a real DCT. Conventional DCT implementations use floating-point arithmetic that require high computational resources. To reduce the computational burden, DCT algorithms have been developed that use fix-point or large integer arithmetic to approximate the floating-point DCT. However, none of these approaches has been able to guarantee coding reversibility. Coding reversibility refers to the ability of a transform algorithm to transform a signal and then inverse transform the transformed signal as closely as possible back to the original signal, without inducing error into the original signal.

Integer transform techniques have been developed to provide coding reversibility. Some of these techniques are described in the following documents. U.S. Pat. No. 5,999,957, Ohta, (2000) "Lossless Transform Coding System For Digital Signals," assigned to NEC Corporation which is a division of U.S. Pat. No. 5,703,799. U.S. Pat. No. 5,999,656, Zandi and Schwartz, (1999) "Overlapped Reversible Transforms for Unified Lossless/Lossy Compression," assigned to Ricoh Corporation. U.S. Pat. No. 5,703,799, Ohta, (1997) "Lossless Transform Coding System For Digital Signals," assigned to NEC Corporation. Ying-Jui Chen, Soontorn Oraintara, and Truong Nguyen, "Video Compression Using Integer DCT," Proceedings of IEEE International Conference on Image Processing (ICIP), 2000.

Among these techniques, transform matrices are derived based on a Hadamard transform to approximate the real DCT. Usually, small integer transform coefficients are chosen to improve coding efficiency. However, the Hadamard transform is a redundant transform in the frequency (or real DCT) domain. These transform matrices were developed without considering the distortion in the frequency domain with respect to the real DCT. The normalization of the transform matrix is also not considered.

SUMMARY OF THE INVENTION

An integer transform matrix is used for implementing a Discrete Cosine Transform (DCT). Optimized values for the integer transform matrix are derived that satisfy certain normalization constraints and that also minimize the frequency distortion in the transform matrix.

BRIEF DESCRIPTION OF THE DRAWINGS

FIG. 1 shows a representation of a 4×4 integer matrix.
FIG. 2 shows a representation of a 8×8 integer matrix.
FIG. 3 shows a representation of a 16×16 integer matrix.

DETAILED DESCRIPTION

Figure 4:
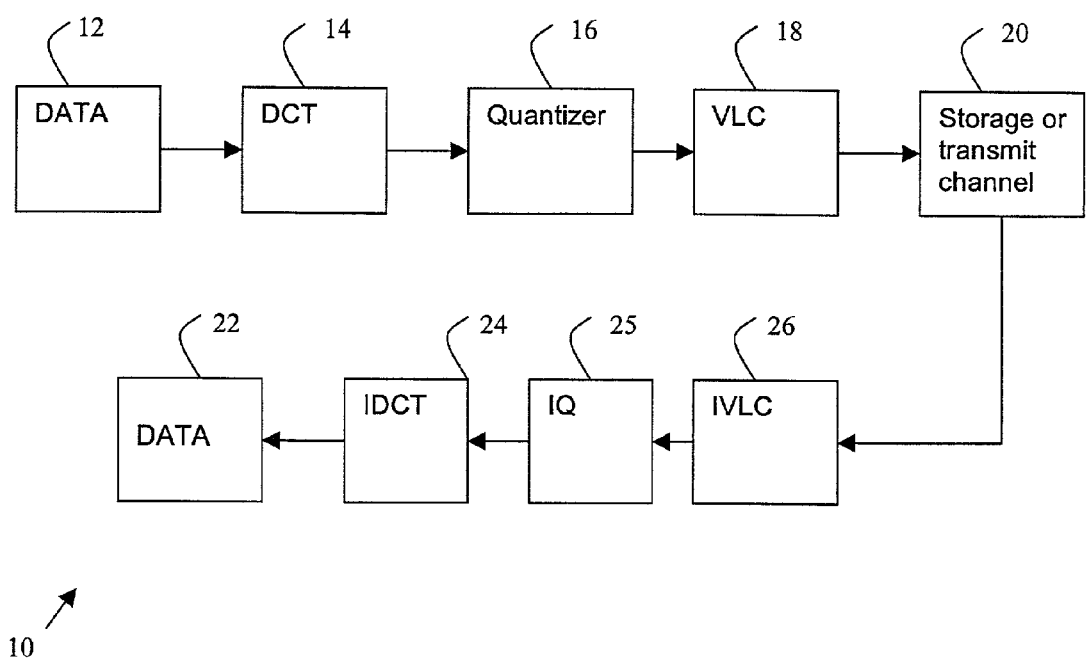
FIG. 4 shows a block diagram that shows an image processing system that uses the integer matrices shown in FIGS. 1–3.

Different sized blocks in an image can be coded with a discrete cosine transform. For example, 16×16, 16×8, 8×16, 8×8, 8×4, 4×8, and 4×4 marcroblocks can be transformed using horizontal and vertical transform matrices of size 4×4, 8×8, and 16×16. The macroblocks are transformed according to the following:

$$C_{n \times m} = T_m \times B_{n \times m} \times T_n^T,$$

where $B_{n \times m}$ denotes an image block with n columns and m rows. The terms $T_n$ and $T_m$ represent the horizontal and vertical transform matrices of size n×n and m×m, respectively. The term $C_{n \times m}$ denotes the cosine transformed n×m block.

An orthogonal 4×4 integer matrix $T_m = T_4$ can be written based on a Hadamard transform as shown in FIG. 1. The values $n_0$, $n_1$, $n_2$, and $n_3$ represent integers. Matrix normalization requires the constraints shown in equation 1, where norm is an integer representing the normalization factor of the matrix.

$$\begin{cases} n_0 = norm \\ n_1^2 + n_3^2 = 2 \cdot norm^2 \\ n_2 = norm \end{cases} \quad \text{EQUATION (1)}$$

The real DCT of the base vector $t_i$ is represented as $d_i$ as shown in equation 2.

$$d_i = t_i \cdot DCT \quad \text{EQUATION (2)}$$

DCT represents the real DCT matrix, which contains the basis functions of the real DCT in column vectors. The frequency distortion of the transform matrix with respect to the real DCT is then defined in equation 3.

$$E_4 = \frac{1}{4} \sum_{i=0}^{3} \sum_{\substack{j=0 \\ j \neq i}}^{3} \frac{|d_i(j)|}{|d_i(i)|} \quad \text{EQUATION (3)}$$

For each factor norm, the optimal transform matrix, if any, is the one giving the minimum distortion as defined in equation (3). Since a large value is expected for $|d_i(i)|$, a matrix with any zero value $d_i(i)$ will be ruled out. This can be taken as an implicit requirement by the definition.

The integer coefficients of several optimal 4×4 transform matrices satisfying equation (1) and having the minimum frequency distortion as defined in equation (3) are listed in the following table. The corresponding matrix with norm of 13 is being used in International Telecommunication Union Standard ITU-T H.26L. The information shown in the following table reveals that a norm of 13 is the most reasonable choice.

| $n_0, n_1, n_2, n_3$ | norm | DCT distortion |
| --- | --- | --- |
| 13, 17, 13, 7 | 13 | 0.11% |
| 17, 23, 17, 7 | 17 | 4.88% |
| 25, 17, 25, 31 | 25 | 5.47% |

An 8×8 transform matrix is shown in FIG. 2. The normalization constraints in this case are shown in equation 4.

$$\begin{cases} n_0 = norm \\ n_1^2 + n_3^2 + n_5^2 = 4 \cdot norm^2 \\ n_2^2 + n_6^2 = 2 \cdot norm^2 \\ n_4 = norm \end{cases} \quad \text{EQUATION (4)}$$

The corresponding distortion function is shown in equation 5.

$$E_8 = \frac{1}{8} \sum_{i=0}^{7} \sum_{\substack{j=0 \\ j \neq i}}^{7} \frac{|d_i(j)|}{|d_i(i)|} \quad \text{EQUATION (5)}$$

The integer coefficients of an optimal 8×8 orthogonal transform matrix satisfying the normalization constraints in equation 4 and having the minimum frequency distortion for equation 5 are listed in the following table.

| $n_0, n_1, \ldots, n_7$ | norm | DCT distortion |
|---|---|---|
| 17, 24, 23, 20, 17, 12, 7, 6 | 17 | 6.95% |

The matrix with norm of 17 is currently being used in the H.26L ABT Core Experiment. A 16×16 matrix is shown in FIG. 3. The normalization constraints for the 16×16 matrix are shown in equation 6.

$$\begin{cases} n_0 = norm \\ n_1^2 + n_3^2 + n_5^2 + n_7^2 + n_9^2 + n_{11}^2 + n_{13}^2 + n_{15}^2 = 8 \cdot norm^2 \\ n_2^2 + n_6^2 + n_{10}^2 + n_{14}^2 = 4 \cdot norm^2 \\ n_4^2 + n_{12}^2 = 2 \cdot norm^2 \\ n_8 = norm \end{cases} \quad \text{EQUATION (6)}$$

The corresponding distortion function for the 16×16 matrix is shown in equation 7.

$$E_{16} = \frac{1}{16} \sum_{i=0}^{15} \sum_{\substack{j=0 \\ j \neq i}}^{15} \frac{|d_i(j)|}{|d_i(i)|} \quad \text{EQUATION (7)}$$

The integer coefficients for an optimal 16×16 orthogonal transform matrix were derived using the constraints in equation 6 and minimizing the distortion function in equation 7. The optimal matrix values derived for the integer coefficients are shown in the following table.

| $n_0, n_1, \ldots, n_{15}$ | Norm | DCT distortion |
|---|---|---|
| 17, 22, 24, 28, 23, 12, 20, 20, 17, 12, 12, 16, 7, 8, 6, 6 | 17 | 32.77% |

In summary, to derive an optimal $2^m \times 2^m$ transform matrix, there should be (m+1) normalization constraints.

$$\begin{cases} n_0 = norm \\ \sum_{i=0}^{2^{m-1}-1} n_{2 \cdot i+1}^2 = 2^{m-1} \cdot norm^2 \\ \sum_{i=0}^{2^{m-2}-1} n_{4 \cdot i+2}^2 = 2^{m-2} \cdot norm^2 \\ \sum_{i=0}^{2^{m-3}-1} n_{8 \cdot i+4}^2 = 2^{m-3} \cdot norm^2 \\ \vdots \\ n_{2^{m-1}} = norm \end{cases} \quad \text{EQUATION (8)}$$

And for a specific norm, the optimal orthogonal matrix should minimize the DCT distortion function shown in equation 9.

$$E_{2^m} = \frac{1}{2^m} \sum_{i=0}^{(2^m-1)} \sum_{\substack{j=0 \\ j \neq i}}^{(2^m-1)} \frac{|d_i(j)|}{|d_i(i)|} \quad \text{EQUATION (9)}$$

Equation 9 effectively multiplies the real DCT with the integer cosine transform matrix. The ideal result is a normalized matrix with zero values everywhere except along the diagonal of the resultant matrix. The diagonal coefficients being 1's. Equation 9 identifies the total error generated by the non-zero values in the nondiagonal coefficients in the resultant between the real DCT and the integer cosine transform.

Since the transform matrix derived in this manner has minimum distortion with respect to a real DCT, it can be used with many existing DCT-based coding techniques. For example, the transform matrix can be used with frequency-based or HVS-based video coding, such as scanning, quantization, and filtering. There is flexibility in defining the distortion function. For example, weighting factors can be assigned to each frequency component based on an HVS mapping.

FIG. 4 shows one example of a system 10 that encodes and decodes data using the optimized transform matrices shown above. The system 10 can be any computer, video device, camera, network processing device, etc. that processes data. Data in block 12 can be any type of information that needs to be transformed. In one example, the system 10 processes video data.

A Discrete Cosine Transform (DCT) in block 14 uses one of more of the optimized transform matrices shown above to DCT transform the data from block 12. The size of integer matrices used on the data depends on size of the blocks the image data is sectioned into. For example, in one application, image data may be sectioned into 4×4 bit macroblocks. In the same or another application, it may be determined that another section of the same image, or a different image, can be more efficiently coded by using 16×16 bit macroblocks. The DCT block 14 includes a memory that contains the different 4×4, 8×8, and 16×16 optimized transform matrices described above. The transform matrix corresponding to the image block size is applied to the individual macro blocks in the image data.

The transformed data is quantized in a block 16 and then variable length coded (VLC) in block 18. The encoded data is either stored in a memory or transmitted over a communication channel in block 20.

The data is decoded by first inverse variable length coding the data in block 26 and inverse quantizing (IQ) the data in block 25. An Inverse Discrete Cosine Transform (IDCT) in block 24 uses the optimized integer cosine matrices for inverse cosine transforming the decoded data. The inverse cosine transform is implemented by applying inverse integer matrices for the matrices shown in FIGS. 1–3. For example, the inverse cosine transform is generated according to the following:

$$B_{n \times m} = T_m^T \times C_{n \times m} \times T_n,$$

where $B_{n \times m}$ denotes the inverse transformed image block with n columns and m rows, $T_n$ and $T_m$ represent the horizontal and vertical integer transform matrices of size n×n and m×m, respectively, and $C_{n \times m}$ denotes the cosine transformed n×m image block.

The inverse integer matrices are selected to correspond to the block sizes used to originally transform the data. The inversed transformed data is then output as inverse transformed data in block 20.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software. Having described and illustrated the principles of the invention in a preferred embodiment thereof, it should be apparent that the invention may be modified in arrangement and detail without departing from such principles. Claim is made to all modifications and variation coming within the spirit and scope of the following claims.

What is claimed is:

1. A system for processing data, comprising:
   a processor using a transform matrix:

$$T_{16} = \begin{bmatrix} t_0 \\ t_1 \\ t_2 \\ t_3 \\ t_4 \\ t_5 \\ t_6 \\ t_7 \\ t_8 \\ t_9 \\ t_{10} \\ t_{11} \\ t_{12} \\ t_{13} \\ t_{14} \\ t_{15} \end{bmatrix} = \begin{bmatrix} n_0 & n_0 & n_0 & n_0 & n_0 & n_0 & n_0 & n_0 \\ n_1 & n_3 & n_5 & n_7 & n_9 & n_{11} & n_{13} & n_{15} \\ n_2 & n_6 & n_{10} & n_{14} & -n_{14} & -n_{10} & -n_6 & -n_2 \\ n_3 & n_9 & n_{15} & -n_{11} & -n_5 & -n_1 & -n_7 & -n_{13} \\ n_4 & n_{12} & -n_{12} & -n_4 & -n_4 & -n_{12} & n_{12} & n_4 \\ n_5 & n_{15} & -n_7 & -n_3 & -n_{13} & n_9 & n_1 & n_{11} \\ n_6 & -n_{14} & -n_2 & -n_{10} & n_{10} & n_2 & n_{14} & -n_6 \\ n_7 & -n_{11} & -n_3 & n_{15} & n_1 & n_{13} & -n_5 & -n_9 \\ n_8 & -n_8 & -n_8 & n_8 & n_8 & -n_8 & -n_8 & n_8 \\ n_9 & -n_5 & -n_{13} & n_1 & -n_{15} & -n_3 & n_{11} & n_7 \\ n_{10} & -n_2 & n_{14} & n_6 & -n_6 & -n_{14} & n_2 & -n_{10} \\ n_{11} & -n_1 & n_9 & n_{13} & -n_3 & n_7 & n_{15} & -n_5 \\ n_{12} & -n_4 & n_4 & -n_{12} & -n_{12} & n_4 & -n_4 & n_{12} \\ n_{13} & -n_7 & n_1 & -n_5 & n_{11} & n_{15} & -n_9 & n_3 \\ n_{14} & -n_{10} & n_6 & -n_2 & n_2 & -n_6 & n_{10} & -n_{14} \\ n_{15} & -n_{13} & n_{11} & -n_9 & n_7 & -n_5 & n_3 & -n_1 \end{bmatrix}$$

$$\begin{bmatrix} n_0 & n_0 & n_0 & n_0 & n_0 & n_0 & n_0 & n_0 \\ -n_{15} & -n_{13} & -n_{11} & -n_9 & -n_7 & -n_5 & -n_3 & -n_1 \\ -n_2 & -n_6 & -n_{10} & -n_{14} & n_{14} & n_{10} & n_6 & n_2 \\ n_{13} & n_7 & n_1 & n_5 & n_{11} & -n_{15} & -n_9 & -n_3 \\ n_4 & n_{12} & -n_{12} & -n_4 & -n_4 & -n_{12} & n_{12} & n_4 \\ -n_{11} & -n_1 & -n_9 & n_{13} & n_3 & n_7 & -n_{15} & -n_5 \\ -n_6 & n_{14} & n_2 & n_{10} & -n_{10} & -n_2 & -n_{14} & n_6 \\ n_9 & n_5 & -n_{13} & -n_1 & -n_{15} & n_3 & n_{11} & -n_7 \\ n_8 & -n_8 & -n_8 & n_8 & n_8 & -n_8 & -n_8 & n_8 \\ -n_7 & -n_{11} & n_3 & n_{15} & -n_1 & n_{13} & n_5 & -n_9 \\ -n_{10} & n_2 & -n_{14} & -n_6 & n_6 & n_{14} & -n_2 & n_{10} \\ n_5 & -n_{15} & -n_7 & n_3 & -n_{13} & -n_9 & n_1 & -n_{11} \\ n_{12} & -n_4 & n_4 & -n_{12} & -n_{12} & n_4 & -n_4 & n_{12} \\ -n_3 & n_9 & -n_{15} & -n_{11} & n_5 & -n_1 & n_7 & -n_{13} \\ -n_{14} & n_{10} & -n_6 & n_2 & -n_2 & n_6 & -n_{10} & n_{14} \\ n_1 & -n_3 & n_5 & -n_7 & n_9 & -n_{11} & n_{13} & -n_{15} \end{bmatrix}$$

to transform the data, where:

$n_0=17$, $n_1=22$, $n_2=24$, $n_3=28$, $n_4=23$, $n_5=12$, $n_6=20$, $n_7=20$, $n_8=17$, $n_9=12$, $n_{10}=12$, $n_{11}=16$, $n_{12}=7$, $n_{13}=8$, $n_{14}=6$, and $n_{15}=6$.

2. A system according to claim 1 wherein the processor conducts a discrete cosine transform on the data according to the following:

$$C_{n \times m} = T_m \times B_{n \times m} \times T_n^T,$$

where $B_{n \times m}$ is an image block of data with n columns and m rows, $T_n$ and $T_m$ are the horizontal and verti 3. A system according to claim 1 wherein the processor conducts an inverse discrete cosine transform on the data according to the following:

$$B_{n \times m} = T_m^T \times C_{n \times m} \times T_n,$$

where $B_{n \times m}$ denotes the inverse discrete cosine transformed image block with n columns and m rows, $T_n$ and $T_m$ represent the horizontal and vertical integer transform matrices of size n×n and m×m, respectively, and $C_{n \times m}$ denotes a cosine transformed n×m image block. cal transform matrices of size n×n and m×m, respectively, and $C_{n \times m}$ denotes the cosine transformed n×m image block.

4. A system according to claim 1 wherein the system is a device that receives, stores or transmits image data.

5. A system according to claim 1 including a memory that stores the transform matrix.

6. A system according to claim 5 wherein the memory stores different sized transform matrices, and the processor applies the different sized transform matrices according to a block size for a portion of the data being transformed.

7. A system according to claim 1 wherein the transform matrix is used for digital video coding.

8. An article of manufacture comprising computer-readable media containing instructions that, when executed or interpreted by a digital processor or cooperating processors, cause that processor or processors to perform a method of processing data, the method comprising:

using a transform matrix to process the data where the transform matrix is a $2^m \times 2^m$ transform matrix that uses the following normalization constraints:

$$\begin{cases} n_0 = norm \\ \sum_{i=0}^{2^{m-1}-1} n_{2 \cdot i+1}^2 = 2^{m-1} \cdot norm^2 \\ \sum_{i=0}^{2^{m-2}-1} n_{4 \cdot i+2}^2 = 2^{m-2} \cdot norm^2 \\ \sum_{i=0}^{2^{m-3}-1} n_{8 \cdot i+4}^2 = 2^{m-3} \cdot norm^2 \\ \vdots \\ n_{2^m-1} = norm \end{cases}$$

where, norm is an integer representing a normalization factor of the transform matrix; and selecting the norm that minimizes a DCT distortion function:

$$E_{2^m} = \frac{1}{2^m} \sum_{i=0}^{(2^m-1)} \sum_{\substack{j=0 \\ j \neq i}}^{(2^m-1)} \frac{|d_i(j)|}{|d_i(i)|}$$

where $d_i = t_i \cdot DCT$, $t_i$ is a base vector of the transform matrix, and DCT is a real Discrete Cosine Transform.

9. The article of manufacture of claim 8 wherein m=16 and the values of the transform matrix comprise the following:

$$T_{16} = \begin{bmatrix} t_0 \\ t_1 \\ t_2 \\ t_3 \\ t_4 \\ t_5 \\ t_6 \\ t_7 \\ t_8 \\ t_9 \\ t_{10} \\ t_{11} \\ t_{12} \\ t_{13} \\ t_{14} \\ t_{15} \end{bmatrix} = \begin{bmatrix} n_0 & n_0 & n_0 & n_0 & n_0 & n_0 & n_0 & n_0 \\ n_1 & n_3 & n_5 & n_7 & n_9 & n_{11} & n_{13} & n_{15} \\ n_2 & n_6 & n_{10} & n_{14} & -n_{14} & -n_{10} & -n_6 & -n_2 \\ n_3 & n_9 & n_{15} & -n_{11} & -n_5 & -n_1 & -n_7 & -n_{13} \\ n_4 & n_{12} & -n_{12} & -n_4 & -n_4 & -n_{12} & n_{12} & n_4 \\ n_5 & n_{15} & -n_7 & -n_3 & -n_{13} & n_9 & n_1 & n_{11} \\ n_6 & -n_{14} & -n_2 & -n_{10} & n_{10} & n_2 & n_{14} & -n_6 \\ n_7 & -n_{11} & -n_3 & n_{15} & n_1 & n_{13} & -n_5 & -n_9 \\ n_8 & -n_8 & -n_8 & n_8 & n_8 & -n_8 & -n_8 & n_8 \\ n_9 & -n_5 & -n_{13} & n_1 & -n_{15} & -n_3 & n_{11} & n_7 \\ n_{10} & -n_2 & n_{14} & n_6 & -n_6 & -n_{14} & n_2 & -n_{10} \\ n_{11} & -n_1 & n_9 & n_{13} & -n_3 & n_7 & n_{15} & -n_5 \\ n_{12} & -n_4 & n_4 & -n_{12} & -n_{12} & n_4 & -n_4 & n_{12} \\ n_{13} & -n_7 & n_1 & -n_5 & n_{11} & n_{15} & -n_9 & n_3 \\ n_{14} & -n_{10} & n_6 & -n_2 & n_2 & -n_6 & n_{10} & -n_{14} \\ n_{15} & -n_{13} & n_{11} & -n_9 & n_7 & -n_5 & n_3 & -n_1 \end{bmatrix}$$

$$\begin{bmatrix} n_0 & n_0 & n_0 & n_0 & n_0 & n_0 & n_0 & n_0 \\ -n_{15} & -n_{13} & -n_{11} & -n_9 & -n_7 & -n_5 & -n_3 & -n_1 \\ -n_2 & -n_6 & -n_{10} & -n_{14} & n_{14} & n_{10} & n_6 & n_2 \\ n_{13} & n_7 & n_1 & n_5 & n_{11} & -n_{15} & -n_9 & -n_3 \\ n_4 & n_{12} & -n_{12} & -n_4 & -n_4 & -n_{12} & n_{12} & n_4 \\ -n_{11} & -n_1 & -n_9 & n_{13} & n_3 & n_7 & -n_{15} & -n_5 \\ -n_6 & n_{14} & n_2 & n_{10} & -n_{10} & -n_2 & -n_{14} & n_6 \\ n_9 & n_5 & -n_{13} & -n_1 & -n_{15} & n_3 & n_{11} & -n_7 \\ n_8 & -n_8 & -n_8 & n_8 & n_8 & -n_8 & -n_8 & n_8 \\ -n_7 & -n_{11} & n_3 & n_{15} & -n_1 & n_{13} & n_5 & -n_9 \\ -n_{10} & n_2 & -n_{14} & -n_6 & n_6 & n_{14} & -n_2 & n_{10} \\ n_5 & -n_{15} & -n_7 & n_3 & -n_{13} & -n_9 & n_1 & -n_{11} \\ n_{12} & -n_4 & n_4 & -n_{12} & -n_{12} & n_4 & -n_4 & n_{12} \\ -n_3 & n_9 & -n_{15} & -n_{11} & n_5 & -n_1 & n_7 & -n_{13} \\ -n_{14} & n_{10} & -n_6 & n_2 & -n_2 & n_6 & -n_{10} & n_{14} \\ n_1 & -n_3 & n_5 & -n_7 & n_9 & -n_{11} & n_{13} & -n_{15} \end{bmatrix}$$

where,
$n_0=17$, $n_1=22$, $n_2=24$, $n_3=28$, $n_4=23$, $n_5=12$, $n_6=20$, $n_7=20$,
$n_8=17$, $n_9=12$, $n_{10}=12$, $n_{11}=16$, $n_{12}=7$, $n_{13}=8$, $n_{14}=6$, and $n_{15}=6$.

10. The article of manufacture of claim 8 including to claim 8 including:

receiving variable sized macroblocks of image data;
   selecting transform matrices corresponding to the variable sized macroblocks; and
   applying the selected transform matrices to the macroblocks.

11. The article of manufacture of claim 8 including using different 4×4, 8×8, and 16×16 transform matrices for Discrete Cosine Transforming different blocks of an image in the data.

12. The article of manufacture of claim 8 including basing the constraints used for deriving the transform matrix on a Hadamard transform.

\* \* \* \* \*